US007133738B2

(12) United States Patent
Eichhorn et al.

(10) Patent No.: US 7,133,738 B2
(45) Date of Patent: Nov. 7, 2006

(54) SYSTEM AND METHOD FOR PROGRAMMING AN AUTOMATION SYSTEM, BASED ON PULSE TIMING DIAGRAMS

(75) Inventors: Annette Eichhorn, Hessdorf (DE); Werner Hoffmann, Herzogenaurach (DE); Helmut Kielburger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 282 days.

(21) Appl. No.: 10/490,419

(22) PCT Filed: Sep. 12, 2002

(86) PCT No.: PCT/DE02/03407
§ 371 (c)(1),
(2), (4) Date: Mar. 23, 2004

(87) PCT Pub. No.: WO03/027782

PCT Pub. Date: Apr. 3, 2003

(65) Prior Publication Data

US 2004/0254653 A1    Dec. 16, 2004

(30) Foreign Application Priority Data

Sep. 25, 2001    (DE) ................. 101 47 166

(51) Int. Cl.
*G06F 19/00*    (2006.01)
*G06F 9/44*    (2006.01)
(52) U.S. Cl. .................. 700/181; 717/105; 717/106
(58) Field of Classification Search ................ 700/181, 700/17, 18, 253, 61, 63, 69, 83, 180, 184, 700/186–188, 56; 318/567, 573, 568.1; 345/762, 345/763; 717/105, 106, 109
See application file for complete search history.

(56) References Cited

U.S. PATENT DOCUMENTS

| 4,736,340 | A |   | 4/1988  | Desserrieres et al. |
|-----------|---|---|---------|---------------------|
| 5,168,441 | A | * | 12/1992 | Onarheim et al. ............ 700/17 |
| 5,321,603 | A |   | 6/1994  | Schwenke |
| 5,509,116 | A | * | 4/1996  | Hiraga et al. .................. 707/1 |
| 5,583,731 | A | * | 12/1996 | Pergent et al. ................ 361/86 |
| 5,790,437 | A | * | 8/1998  | Schuh et al. .................. 702/68 |
| 6,026,336 | A | * | 2/2000  | Sakurai et al. ................ 700/86 |
| 6,795,748 | B1 | * | 9/2004 | Hammer et al. ............ 700/181 |
| 6,981,226 | B1 | * | 12/2005 | Schmitt et al. ............ 715/764 |
| 7,000,191 | B1 | * | 2/2006  | Schmitt et al. ............ 715/764 |

OTHER PUBLICATIONS

V. Carré-Ménétrier, C. Ndjab, F. Gellot, J. Zaytoon; "A Case Tool for the Synthesis of Optimal Control Implementation of Grafcet"; IEEE International Conference on Systems, Man, and Cybernetics; Oct. 1999; pp. I-796-I-801; vol. 1, 12-15.

* cited by examiner

*Primary Examiner*—Thomas Pham

(57) ABSTRACT

The invention relates to a system and method for programming an automation system. To avoid conversion errors and to guarantee data during the programming of an automated system, a graphic description by means of pulse timing diagrams is used to generate a program of the automation system, in particular the program of a memory programmable control. Modifications of the pulse timing diagrams thus lead directly to modifications of the program of the memory programmable control, without the need for a renewed conversion that potentially contains errors.

11 Claims, 8 Drawing Sheets

SYSTEM AND METHOD FOR PROGRAMMING AN AUTOMATION SYSTEM, BASED ON PULSE TIMING DIAGRAMS

CROSS REFERENCE TO RELATED APPLICATIONS

This application is the US National Stage of International Application No. PCT/DE02/03407, filed Sep. 12, 2002 and claims the benefit thereof. The International Application claims the benefits of German application No. 10147166.1 DE filed Sep. 25, 2001, both of the applications are incorporated by reference herein in their entirety.

FIELD OF INVENTION

The invention relates to a system and method for programming an automation system based on pulse timing diagrams.

BACKGROUND OF INVENTION

A system and method of this type is employed in the area of automation technology, in particular in production and process automation. This frequently entails the production by the "design department" of pulse timing diagrams, also referred to as pneumatic flowcharts or as path-time diagrams, for describing machine movements. The pulse timing diagrams thus identify a desired course of machine movements. As regards the programming of stored program controls (SPCs) of an automation system, this means that error-free automated operation of the system is described with the aid of the pulse timing diagrams with no consideration being given to operating modes or the handling of errors. In modern automation solutions the pulse timing diagrams are generally produced by a design engineer. Said diagrams are then converted manually from the graphical description into programs for the stored program controls by an automation engineer responsible for producing SPC programs using, for instance, the SPC programming language AWL.

U.S. Pat. No. 5,321,603 discloses a programming device for an industrial controller, which programming device enables graphical information to be converted into a control program by way of a compiler.

SUMMARY OF INVENTION

The object of the invention is to disclose a system or method for programming an automation system which, while taking data consistency into consideration, will also enable the automation system to be placed into operation and monitored.

Said object is achieved by means of a system and a method with the features recited in claims 1 and 6 respectively.

The invention is based on the knowledge that pulse timing diagrams produced by, for instance, a design engineer, can also be (re-)used for programming the automation system, in particular for programming stored program controls. This type of (re-)use is ensured by the fact that within an intelligent tool enabling the generation both of the pulse timing diagrams and of expansions thereof, a database is provided which can then be converted without substantial effort into data which can be processed by the automation system, in particular by a stored program control. The overall result is consequently data consistency because, thanks to the integration into a standardized tool, if modifications/corrections are made to the pulse timing diagrams, modifications or adaptations can also be made directly to the expansions and, derived therefrom, to an ensuing code generation for the programs of the automation system. The various user groups such as design, automation, and commissioning engineers all work within a standardized tool on the same set of data in each case, thereby avoiding conversion errors.

A particularly advantageous application ensues from the fact that the data program is provided for programming at least one stored program control of the automation system. This results in the generation of an SPC program from the graphical description of the pulse timing diagrams, augmented by SPC-specific expansions such as operating modes, error handling etc., in particular by an automation engineer.

Generation of the pulse timing diagrams and of their expansions in a manner which is simple and ergonomic for the user is ensured by the device's having an intelligent editor for producing the graphical pulse timing diagrams and expansions in such a way that the expansions are made via a zoom-in editor via which additional information can be generated which can be linked to the data of the pulse timing diagrams.

Re-use for observation and diagnostic purposes of the pulse timing diagrams produced for planning, designing, and commissioning, and of the associated expansions, takes place in such a way that the data of the pulse timing diagrams can be linked to an operating and observation system.

Direct evaluation of the pulse timing diagrams and/or expansions within an operating and observation system can be effected in such a way that said system is provided for representing the generated graphical pulse timing diagrams as a comparison with current operational data.

Simple and efficient diagnosis can be achieved by providing the system for overlaying the generated graphical pulse timing diagrams relating to the current operational data in such a way that, if an error is detected, said error will be visualized in the pulse timing diagrams and the represented current operational data.

BRIEF DESCRIPTION OF THE DRAWINGS

The invention is described and explained in more detail below with reference to the exemplary embodiments shown in the figures.

DETAILED DESCRIPTION OF INVENTION

Figure 1:
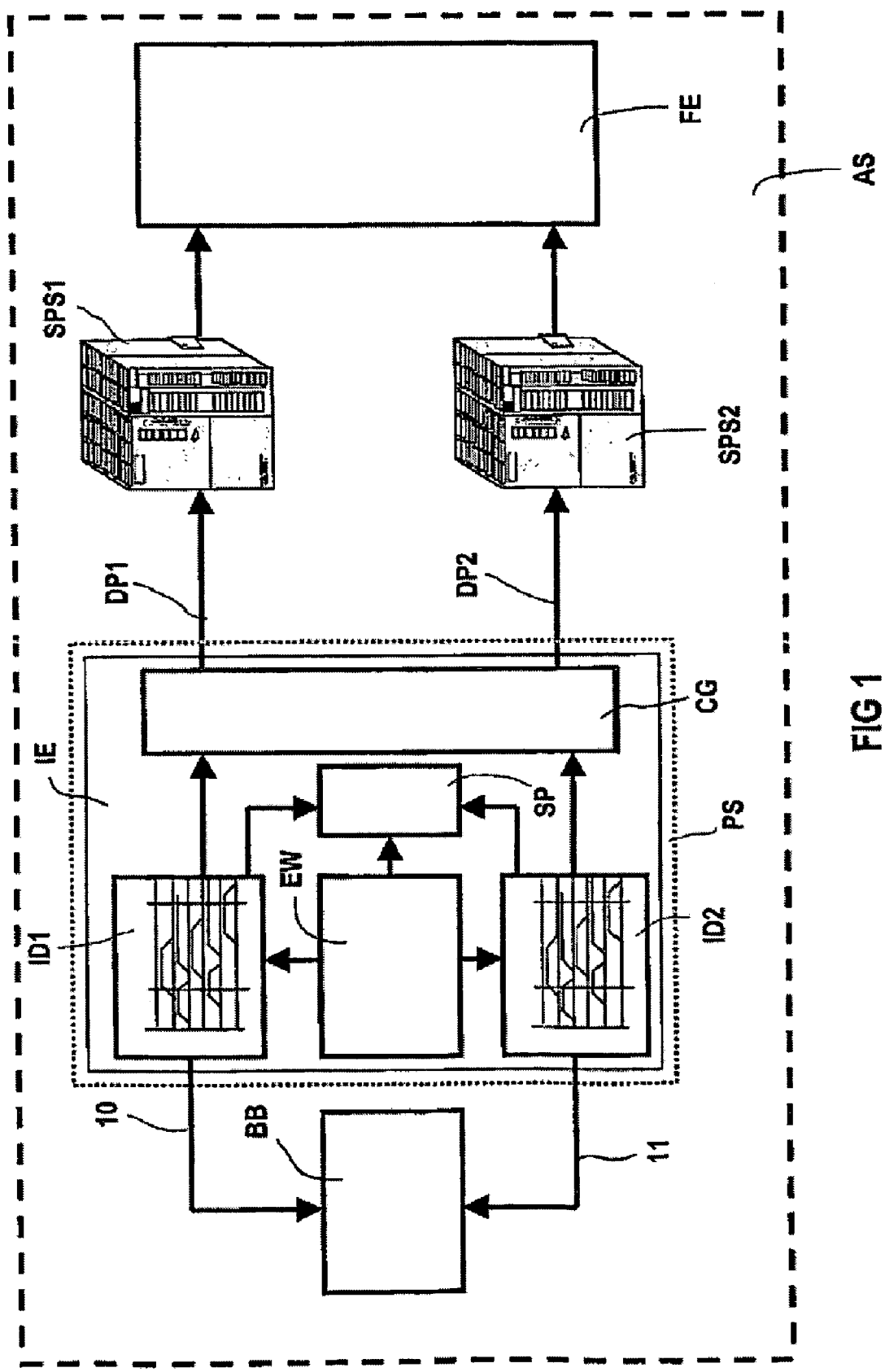
FIG. 1 is a block diagram of an exemplary embodiment of an automation system with stored program controls programmed by means of pulse timing diagrams.

FIG. 1 is a block diagram of an exemplary embodiment of an automation system AS. Said automation system AS consists of an operating and observation system BB, of stored program controls SPS1, SPS2, and of a production facility FE. The stored program controls SPS1, SPS2 are controlled via data programs DP1, DP2 produced by means of a programming system PS. The programming system PS includes a code generator CG which generates a code which can be processed by the stored program controls. The data programs DP1, DP2 are based on pulse timing diagrams ID1, ID2 and on expansions EW which are generated by means of an intelligent editor TE. The intelligent editor IE further comprises a memory SP for storing the data of the pulse timing diagrams ID1, ID2 and of the expansions EW.

The basic flow of programming the automation system AS shown in FIG. 1 is described in more detail below. The intelligent editor IE is the central component for producing the data programs DP1, DP2 of the stored program controls SPS1, SPS2. With the aid of the intelligent editor IE a design engineer, for instance, employs the customary method to design pulse timing diagrams ID1, ID2 whose layout is produced in accordance with, for example, VDI specification 3230. The pulse timing diagrams ID1, ID2 produced in this way are provided in a second step by, for instance, an automation engineer with expansions EW, also with the aid of the intelligent editor IE. This is done by incorporating relevant expansions EW into the pulse timing diagrams ID1, ID2 via, for example, zoom-ins to the individual states or, as the case may be, signals of the pulse timing diagrams ID1, ID2. As a result, there is a direct reference between the pulse timing diagrams ID1, ID2 and the expansions EW. The SPC programs DP1, DP2 are then generated from the graphical description of the pulse timing diagrams ID1, ID2, expanded to include the relevant SPC-specific expansions such as operating modes, error handling, etc. The data programs DP1, DP2 for the stored program controls SPS1, SPS2 are generated with the aid of the code generator CG. It is therefore ensured with the aid of the intelligent editor IE that all work in connection with producing the data programs DP1, DP2 is performed with the aid of a uniform tool and that all the necessary data is contained within one tool (in the form of the intelligent editor) IE. This obviates conversion errors and data consistency is ensured. The production facility FE, which is controlled by the stored program controls SPS1, SPS2, is then started up with the aid of the data programs DP1, DP2. It is further indicated in FIG. 1 with the aid of the connections 10, 11 from the pulse timing diagrams ID1, ID2 to the operating and observation system BB that the flows described in the pulse timing diagrams ID 1, ID2 can also be used in the operating and observation system BE for observation and diagnosis.

Figure 2:
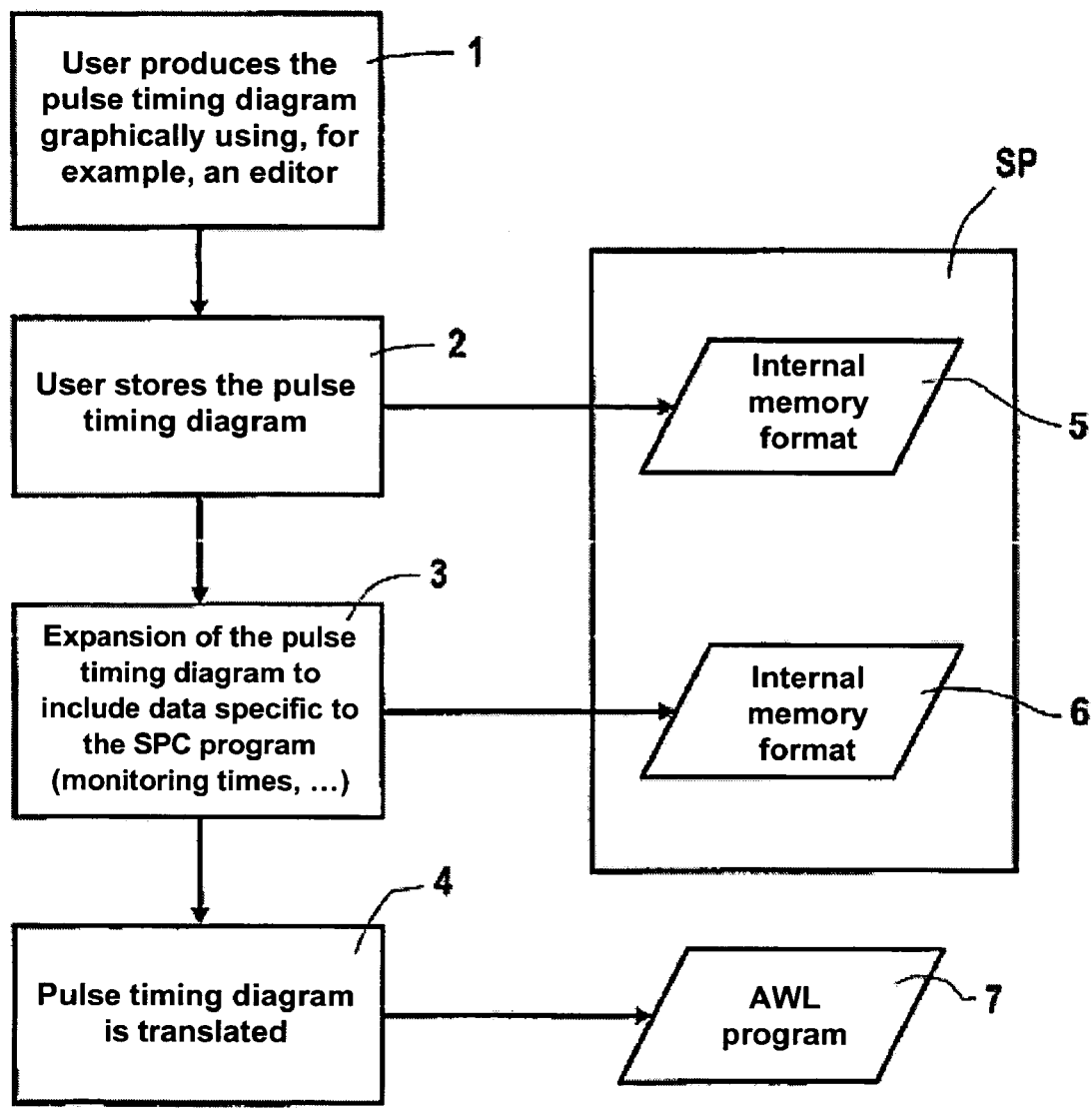
FIG. 2 is a schematic of the procedural flow for generating pulse timing diagrams with expansions.

FIG. 2 is a schematic of the procedural flow for generating pulse timing diagrams with expansions. In step 1 of the program flow shown in FIG. 2, a user produces graphically corresponding pulse timing diagrams using the intelligent editor (see also FIG. 1). The pulse timing diagram produced with the editor is stored by the user in step 2. Storage takes place in a first internal memory format 5 in the memory SP. The pulse timing diagram is expanded in step 3 to include data specific to the SPC program such as operating modes, error handling, monitoring times, etc. These expansions are also stored in the memory SP in a second internal memory format 6. The pulse timing diagram, including the expansions, is translated into a program code, for example into what is termed the AWL program code, in a step 4, so that the AWL program 7 is finally available as a program which can be used for a stored program control.

The major advantage of the method described in FIG. 2 is that the data of the pulse timing diagrams and also the expansions are appropriately processed within a uniform tool and are stored in a common memory SP. This results in end-to-end processing of the pulse timing diagrams produced by a design engineer in, for example, step 2 and of the expansions added by an automation engineer in step 3. The data required by the automation system for commissioning a production facility or, as the case may be, a technical process, is thus available in a re useable data format so that conversion errors are avoided. The program 7 available in the form of, for example, AWL code can furthermore also be used for observation and diagnostic purposes without the need for additional programming effort.

Figure 3:
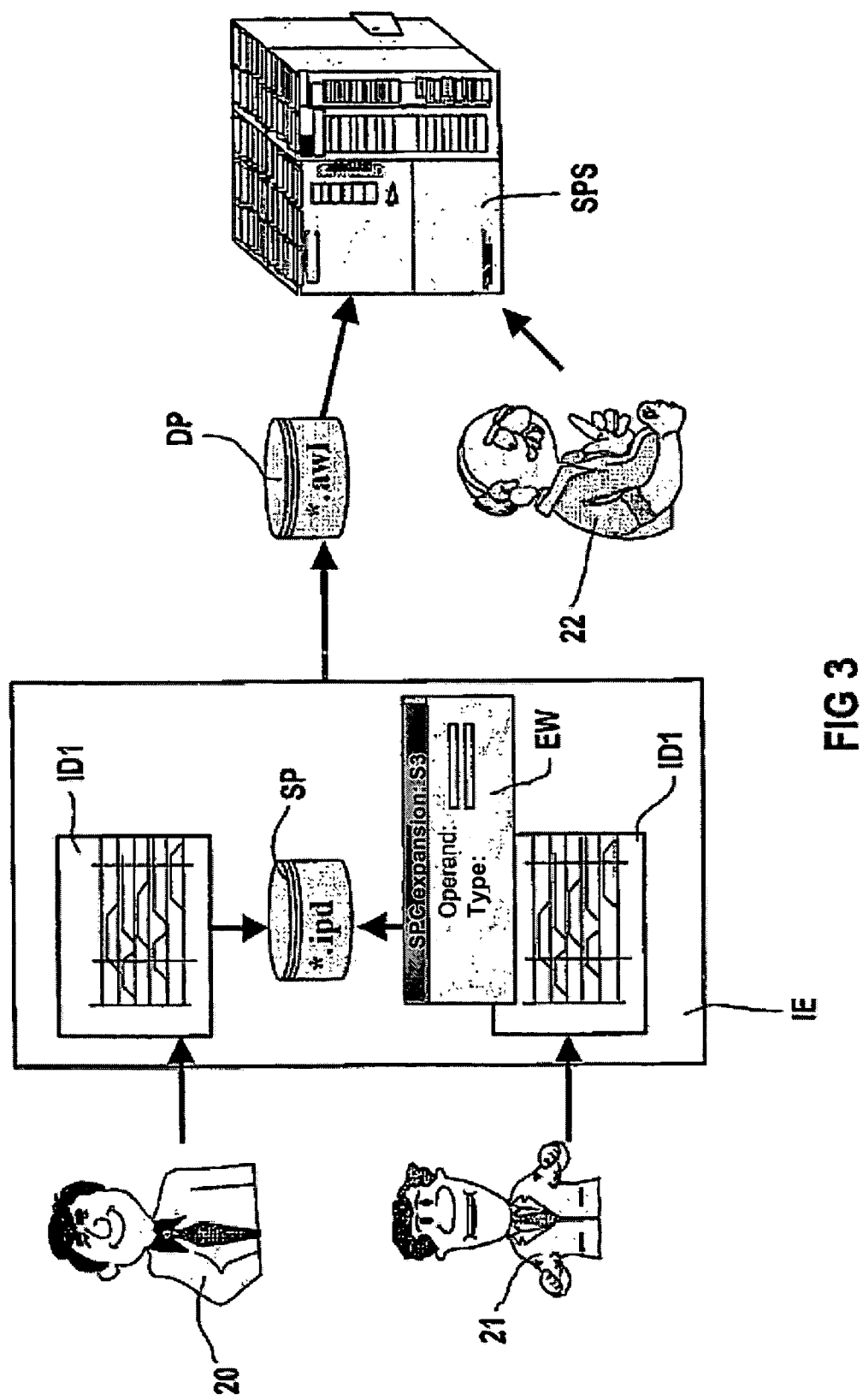
FIG. 3 is a schematic of generating the data of the pulse timing diagrams with expansions and of the participating users.

FIG. 3 is a schematic of the production of the pulse timing diagrams ID1 with expansions EW and of the participating users in the form of a design engineer 20, an automation engineer 21, and a commissioning engineer 22. FIG. 3 illustrates that the design engineer's function is to generate pulse timing diagrams in the customary manner. The special feature here is that the pulse timing diagrams are generated by means of the intelligent editor IE. To do this, the data of the pulse timing diagrams ID1 is stored in the memory SP in a special data format, in the exemplary embodiment having the extension "ipd" to identify the data as being pulse timing diagrams (from the German "Impulsdiagramme" meaning "pulse timing diagrams"). The automation engineer 21 also works with the same *.ipd data stored in the memory SP and adds expansions EW to the pulse timing diagrams ID1 using the intelligent editor IE. In the exemplary embodiment, additional information is entered for this in relevant "Operand" and "Type" data fields in the entry field for the expansions EW. The data which has been modified/augmented in this way is in turn saved in the data memory SP by the automation engineer 21. With the aid of the code generator CG, the *.ipd data is converted inside or outside the intelligent editor IE into a data program DP which, in the exemplary embodiment, has a data format *.awl, which is to say an AWL format. Said data program DP is used by the commissioning engineer 22 to start up an automation system linked to the stored program control.

Figure 4:
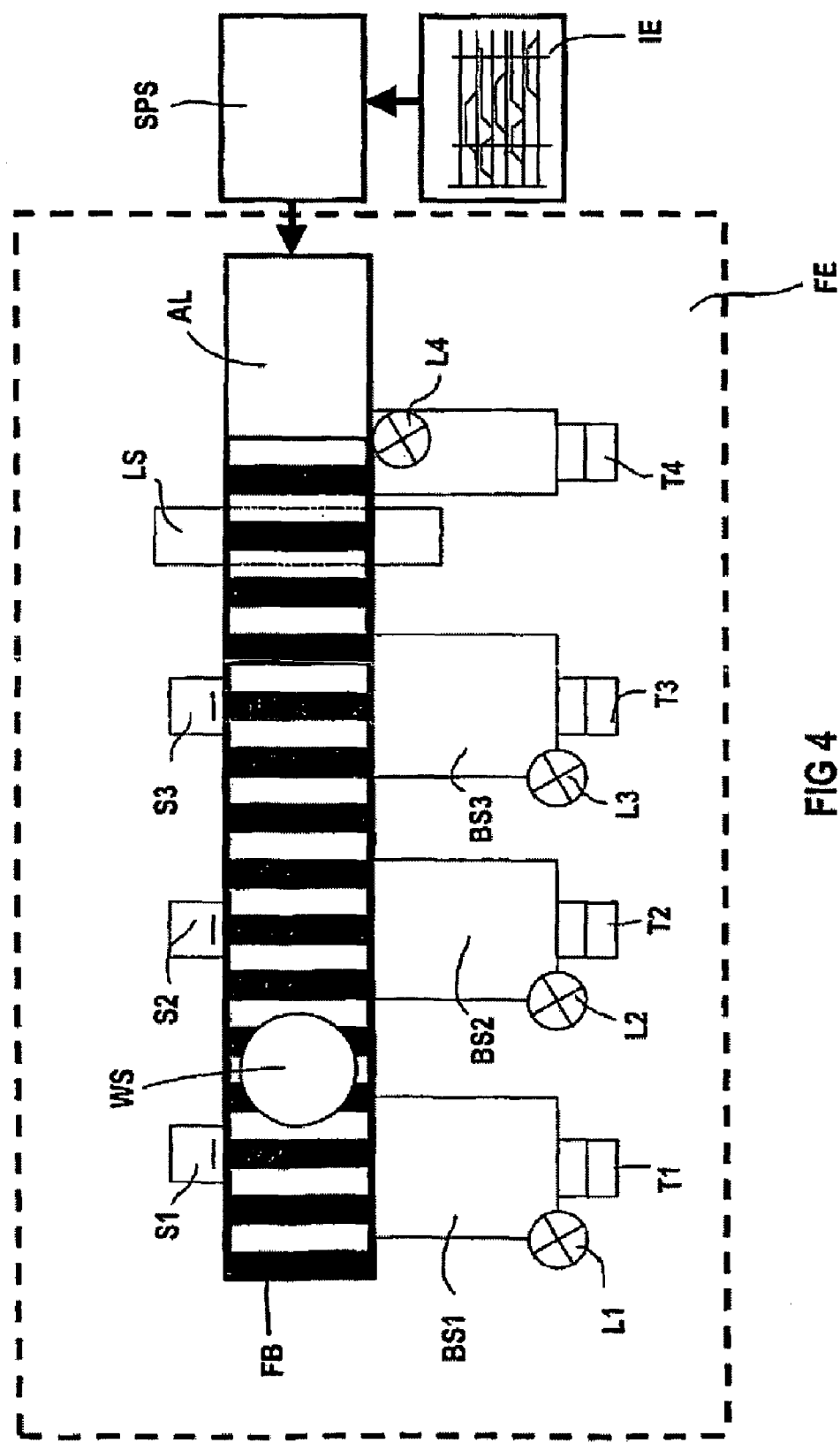
FIG. 4 is a schematic example, in the form of a model system, of an automation system being controlled via pulse timing diagrams.

FIG. 4 is a schematically represented example, in the form of a model system, of an automation system being controlled via pulse timing diagrams. Said model system consists of a production facility FE controlled by a stored program control SPS which can be programmed by an intelligent editor IE. Said production facility FE includes a conveyor belt FB on which can be conveyed a work piece WS. Said conveyor belt FB serves to transport the work piece WS from processing stations BS1, BS2, BS3 to a storage facility AL. Tran sporting of the work piece WL onto the conveyor belt FB is controlled with the aid of sensors S1, S2, S3 and by means of a photoelectric beam LS. In the area of the processing stations BS1, BS2, BS3 there is in each case a lamp L1, L2, L3 and a pushbutton T1, T2, T3. In the area of the storage facility AL there is another lamp L4 and another pushbutton T4. Transporting of the work piece WS from the processing stations BS1 . . . BS3 to the storage facility AL is time-controlled, as will be further explained in connection with FIG. 5, by means of pulse timing diagrams and corresponding expansions, which are also stored in the intelligent editor IE.

Figure 5:
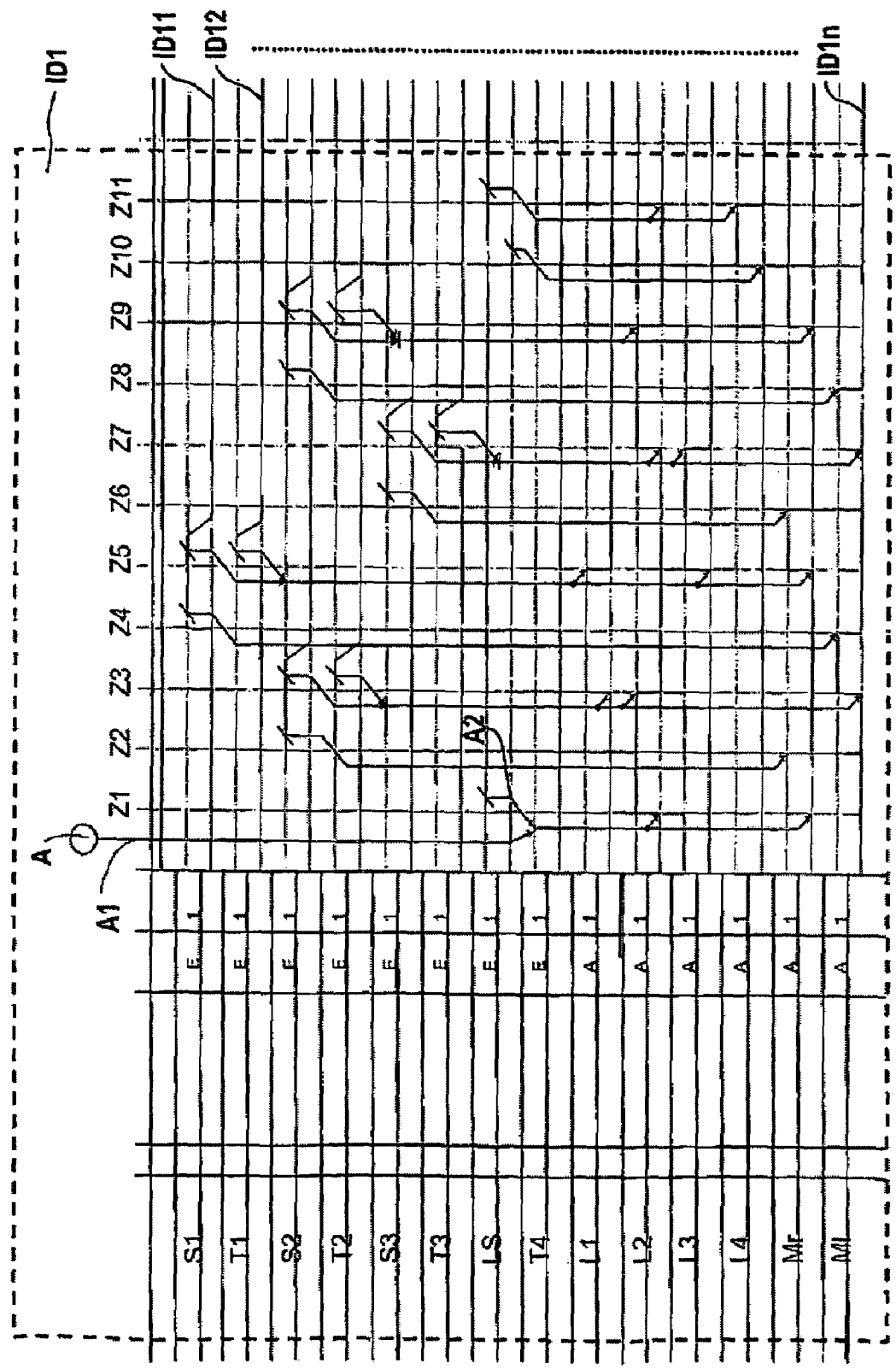
FIG. 5 is a schematic of exemplary pulse timing diagrams of the model system shown in FIG. 4.

FIG. 5 is a schematic of an exemplary pulse timing diagram ID1 for programming a stored program control which controls the exemplary mode I system shown in FIG. 4. The pulse timing diagram ID1 consists of individual pulse curves ID11 . . . ID1n. The pulse timing diagram curves ID11 . . . ID1n in each case identify required switching states Z1 . . . Z11 of the sensors S1, S2, S3, the pushbuttons T1, T2, T3, T4, the lamps L1 . . . L4, the photoelectric beam LS, and the conveyor belt motor shown in FIG. 4, identified by pulse timing diagrams for a right-hand rotation of the motor Mr or, as the case may be, for a left-hand rotation of the motor M1. The pulse timing diagram curves ID11, ID1n here identify the respective switching state 0 or, as the case may be, 1 of the corresponding sensors, pushbuttons, lamps etc., whereas the respective drives from a start time A with reference to the sensor/actuator characteristics are identified with the aid of the essentially vertically flowing drive lines A1 . . . A2. As already explained in connection with FIG. 1 and FIG. 2, the pulse timing diagram shown in FIG. 4 is produced by, for example, a design engineer. The special feature is that the pulse timing diagrams are further used and provided with expansions within the intelligent editor IE, as further shown in FIG. 6 and explained below.

Figure 6:
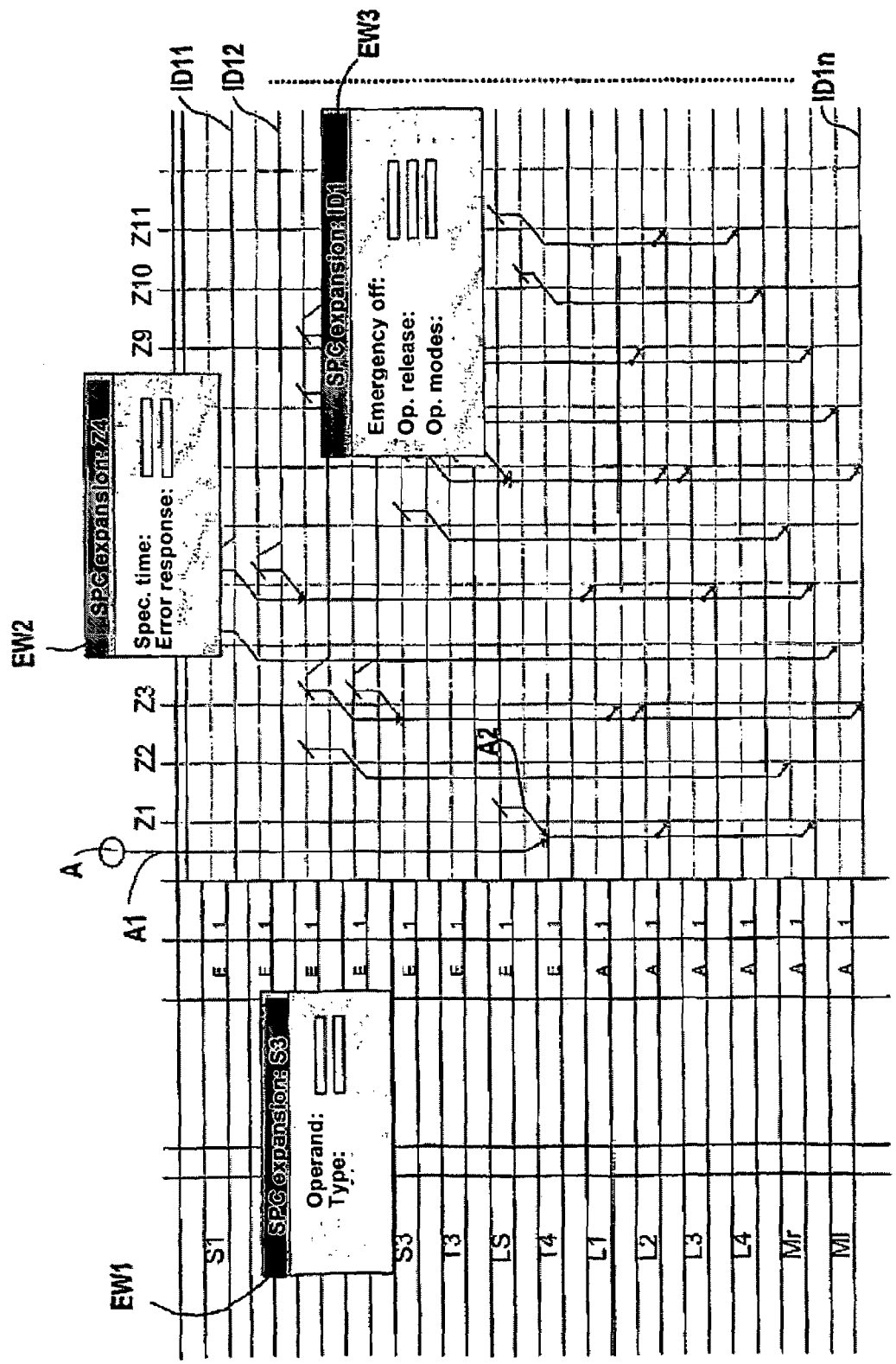
FIG. 6 is a schematic of exemplary pulse timing diagrams of the model system shown in FIG. 4 with expansions for programming a stored program control.

FIG. 6 shows the pulse timing diagram curves of the model system shown in FIG. 4 already shown in connection with FIG. 5. FIG. 6 additionally has three exemplary data fields EW1, EW2, EW3 serving to enter expansions for the pulse timing diagrams ID11 . . . ID1n. The first expansion data field EW1 has entry options for switch S3 in the form of the "Operand" and "Type" data fields. The second expansion data field EW2 serves to enter expansions for a state 4 of the model system, while the third expansion data field EW3 serves to identify expansions for the pulse timing diagram ID1. The special feature of the data fields shown by way of example in FIG. 5 is that both the pulse timing diagram curves ID11 . . . ID1n and the expansions EW1 . . . EW3 are stored within a database and serve as the starting point for conversion into a data program in the form of, for example, what is termed an AWL program that can be read by an automation system.

Figure 7:
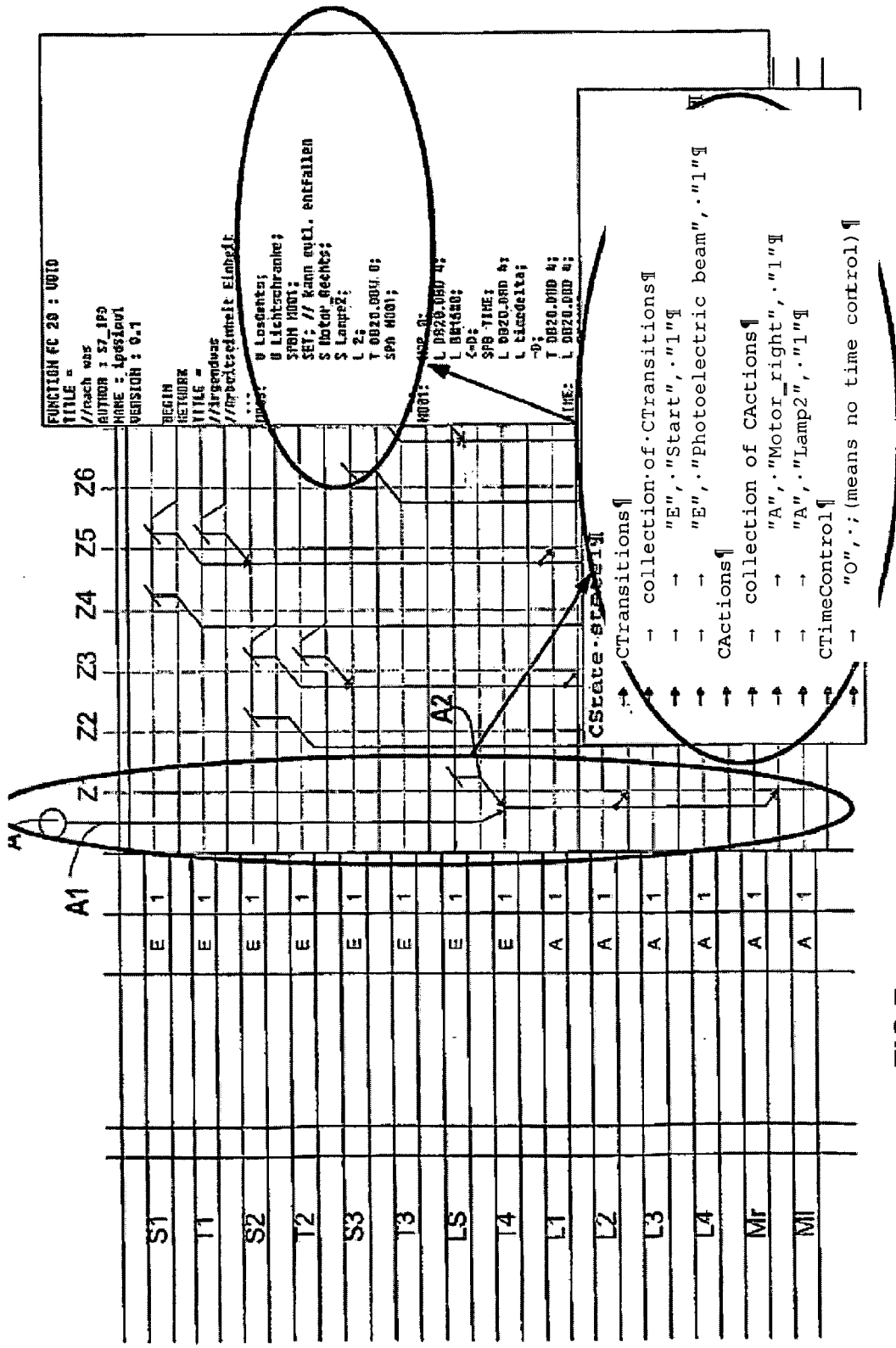
FIG. 7 is a schematic of exemplary pulse timing diagrams of the model system shown in FIG. 4 with exemplary explanations for generating a data program from the pulse timing diagrams for programming a stored program control.

FIG. 7 is a schematic of a data conversion of this type as is performed with the aid of, for example, the code generator CG shown in FIG. 1. The relevant states of the individual sensors/actuators of the model system are here converted into an internal memory format, for example into an "ipd" format already described in connection with FIG. 3, as shown in FIG. 7 in the cutout window F2 for a state cut out in the cutout window F1. The internal memory format describes the respective levels of the individual sensors/actuators during the respective states Z1 . . . Z11. A data program, as shown by way of example in window F3, is produced with the aid of the code generator (see also FIG. 1) from the pulse timing diagram curves ID1 . . . 1D2 augmented by the further expansions EW1 . . . EW3 (see also FIG. 6), which is to say from all the information of the internal memory format *.ipd in accordance with the data shown by way of example in window F2. The data program shown in window F3 serves to control the model system.

The overall result is therefore an end-to-end expansion of the data incorporated by the design department in the form of the pulse timing diagrams ID1 . . . IDN taking into consideration the augmentations incorporated by the automation engineer in the form of the expansions step-by-step until a production facility, for example the model system shown in FIG. 4, is placed into operation.

Figure 8:
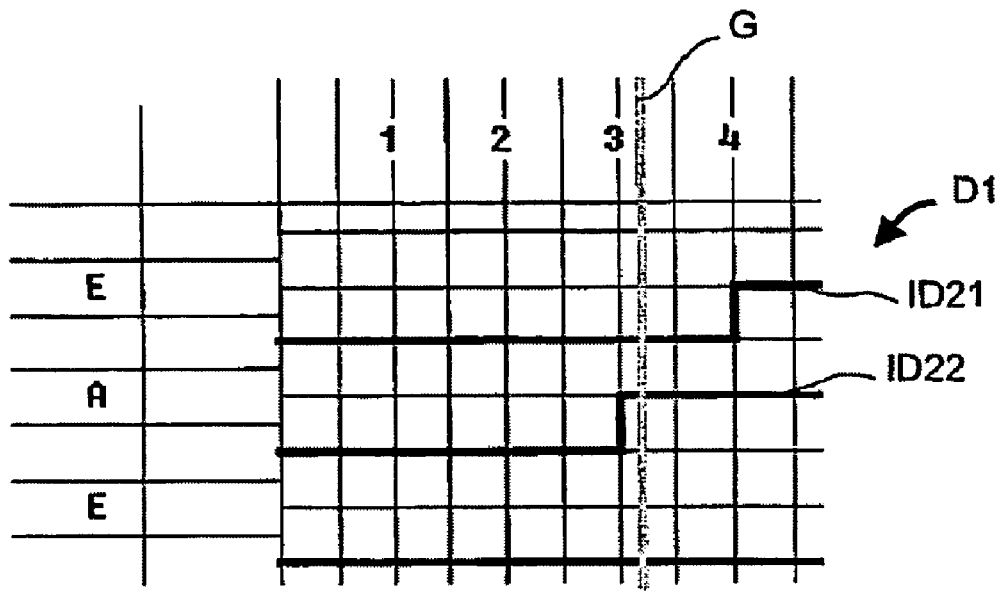
FIGS. 8, 9 are schematics of pulse timing diagrams for an online observation of an automation system.
Figure 9:
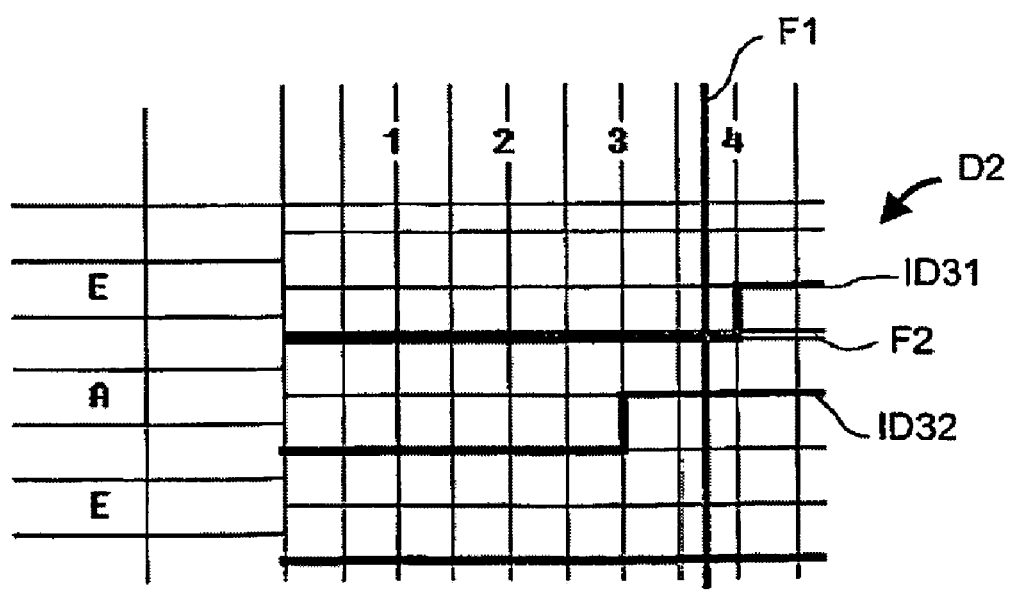

FIGS. 8, 9 are schematics of pulse timing diagrams for an online observation of an automation system. FIG. 8 shows the application wherein pulse timing diagram curves ID21, ID22 are also used for operating and diagnostic purposes. Diagram D1 in FIG. 8 shows the observation of a current state of a system, with what is termed the "ok" case being visualized by means of a vertical bar maintained in the color green, for example, while a case of error in the pulse timing diagrams ID31, ID32 is identified in diagram D2 in FIG. 9 by means of crossover vertical lines F1, F2. Having been described once in the pulse timing diagrams, the flows and expansions of an application, for example of an operating and observation system, are thus re-used also for diagnostic purposes. Ongoing operation can thus be observed without the need for additional inputs. The measured current data is displayed on a monitor as an overlay signal, with the possibility of changing the color in the event of an error, as shown in diagram D2.

To summarize, the invention thus relates to a system and a method for programming an automation system AS. To avoid conversion errors and to ensure data consistency during the programming of an automation system AS, it is proposed using a graphical description by means of pulse timing diagrams ID1, ID2 to generate a program of the automation system AS, in particular of the program of a stored program control SPS1, SPS2. Modifications to the pulse timing diagrams ID1, ID2 will thus lead directly to modifications to the program of the SPS without the need for renewed, error-prone conversion.

The invention claimed is:

1. A system for programming an automation system, comprising:
   a device adapted for generating graphical pulse timing diagrams for providing timing information for controlling a sequence of machine movements of an automation system;
   a plurality of expansions via data fields having a direct reference to the pulse timing diagrams for providing control information linked to the graphical pulse timing diagrams for controlling the machine movements at desired times during the sequence;
   a data program adapted to operate the automation system, said program being generated from the graphical pulse timing diagrams produced by the device in combination with the expansions;
   an intelligent editor adapted to produce the graphical pulse timing diagrams and the expansions; and
   a zoom-in editor adapted to produce the graphical pulse timing diagrams and the expansions, said expansions being adapted to produce the control information linkable with the pulse timing diagrams.

2. The system according to claim 1, wherein the data program is provided for ruing in at least one stored program control of the automation system.

3. The system according to claim 1, wherein the data of the pulse-timing diagrams is adapted for liking to an operating and observation system.

4. The system according to claim 1, wherein the operating and observation system is adapted to represent the generated graphical pulse timing diagrams as a comparison with current operational data.

5. The system according to claim 1, wherein the system is adapted to compare the graphical pulse timing diagrams with the current operational data and to display errors identified during said comparison.

6. A method for programming an automation system, comprising:

generating graphical pulse timing diagrams for providing timing information for controlling a sequence of machine movements of an automation system and expansions assignable to the graphical pulse timing diagrams via data fields for providing control information linked to the graphical pulse timing diagrams for controlling the machine movements at desired times during the sequence;

generating a data program adapted to operate the automation system from the generated graphical pulse timing diagrams in combination with the expansions for the automation system; and producing the graphical pulse timing diagrams and the associated expansions by an intelligent editor in such a way that the expansions are made via a zoom-in editor containing the control information linked to the pulse timing diagrams.

7. The method according to claim 6, wherein the data program is processed by at least one store program control of the automation system.

8. The method according to claim 6, wherein the pulse timing diagrams are visualized in an operating and observation system.

9. The method according to claim 6, wherein the generated graphical pulse timing diagrams are represented in the operating and observation system as a comparison with current operational data.

10. The method according to claim 6, wherein the generated graphical pulse timing diagrams relating to the current operational data are overlaid in such a way that, if an error is detected, the error will be visualized in the pulse timing diagrams and the represented current operational data.

11. The method according to claim 6, wherein a computer program product having the elements for performing the method when the computer program is executed on an electronic circuit or an automation system.

* * * * *